(12) United States Patent
Saito

(10) Patent No.: US 7,447,914 B1
(45) Date of Patent: Nov. 4, 2008

(54) METHOD FOR CONTROLLING DATABASE COPYRIGHTS

(75) Inventor: Makoto Saito, Tokyo (JP)

(73) Assignee: Intarsia Software LLC, Las Vegas, NV (US)

( * ) Notice: Subject to any disclaimer, the term of this patent is extended or adjusted under 35 U.S.C. 154(b) by 0 days.

(21) Appl. No.: 08/895,493

(22) Filed: Jul. 16, 1997

Related U.S. Application Data

(63) Continuation of application No. 08/416,037, filed on Mar. 31, 1995, now abandoned.

(30) Foreign Application Priority Data

Apr. 1, 1994 (JP) .................................. 6-064889

(51) Int. Cl.
*G06F 11/30* (2006.01)
(52) U.S. Cl. ........................ 713/191; 717/174; 726/18
(58) Field of Classification Search .................. 380/4, 380/21, 25, 23, 279, 277, 280, 270, 200–203; 713/193, 166, 167, 172, 168, 165; 705/51, 705/54, 57, 59; 382/124; 401/104; 726/27, 726/31, 33, 26; 717/174
See application file for complete search history.

(56) References Cited

U.S. PATENT DOCUMENTS

| | | |
|---|---|---|
| 4,104,721 A | 8/1978 | Markstein et al. |
| 4,168,396 A | 9/1979 | Best |
| 4,225,884 A | 9/1980 | Block et al. |
| 4,278,337 A | 7/1981 | Mashimo |
| 4,278,837 A | 7/1981 | Best |
| 4,352,952 A | 10/1982 | Boone et al. |
| 4,386,233 A | 5/1983 | Smid et al. ............... 178/22.08 |
| 4,423,287 A | 12/1983 | Zeidler |

(Continued)

FOREIGN PATENT DOCUMENTS

DE    3717261    11/1987

(Continued)

OTHER PUBLICATIONS

Engryption of information to be recorded so as to prevent unauthorized playback, 2244 Research Disclosure, Mar. 1992, No. 335, Emsworth, GB.*

(Continued)

*Primary Examiner*—Thanhnga Truong
*Assistant Examiner*—Paula W Klimach

(57) ABSTRACT

In the present invention, copyrights of digital data in a database system including real time transmission of a digital picture are controlled. Permit keys including a crypt key, are used when data which is encrypted and supplied is displayed, edited, stored, copied and transferred. As necessary, one or more of a copyright control program, copyright information or copyright control message are used, in addition to the permit key. The copyright control program, the copyright information and the copyright control message are supplied together with the permit key, or together with the data, or a part of them is supplied together with the permit key and the other part of them is supplied together with the data. The permit key, the copyright control message, the copyright information and the copyright control program are supplied with encryption or without encryption. The data is transmitted with encryption and is decrypted to be used, and may be encrypted again when stored, copied or transferred.

35 Claims, 4 Drawing Sheets

U.S. PATENT DOCUMENTS

| | | | |
|---|---|---|---|
| 4,465,901 A | 8/1984 | Best | |
| 4,527,195 A | 7/1985 | Cheung | |
| 4,558,176 A | 12/1985 | Arnold et al. | |
| 4,567,512 A | 1/1986 | Abraham | |
| 4,588,991 A * | 5/1986 | Atalla | 340/825.31 |
| 4,613,901 A | 9/1986 | Gilhousen et al. | |
| 4,623,918 A | 11/1986 | Chomet | |
| 4,709,266 A | 11/1987 | Hanas et al. | |
| 4,710,955 A | 12/1987 | Kauffman | |
| 4,736,422 A | 4/1988 | Mason | |
| 4,751,732 A | 6/1988 | Kamitake | |
| 4,757,534 A | 7/1988 | Matyas et al. | |
| 4,759,062 A | 7/1988 | Traub et al. | |
| 4,791,565 A | 12/1988 | Dunham | |
| 4,796,220 A | 1/1989 | Wolfe | |
| 4,799,156 A | 1/1989 | Shavit et al. | |
| 4,817,140 A | 3/1989 | Chandra et al. | |
| 4,827,508 A * | 5/1989 | Shear | 380/3 |
| 4,829,569 A | 5/1989 | Seth-Smith et al. | |
| 4,850,017 A * | 7/1989 | Matyas et al. | 380/280 |
| 4,852,154 A | 7/1989 | Lewis et al. | |
| 4,862,268 A | 8/1989 | Campbell et al. | |
| 4,864,494 A | 9/1989 | Kobus, Jr. | |
| 4,864,614 A | 9/1989 | Crowther | |
| 4,864,615 A | 9/1989 | Bennett et al. | |
| 4,890,319 A | 12/1989 | Seth-Smith et al. | |
| 4,890,321 A | 12/1989 | Seth-Smith et al. | |
| 4,905,277 A | 2/1990 | Nakamura | |
| RE33,189 E | 3/1990 | Lee et al. | |
| 4,916,737 A | 4/1990 | Chomet et al. | |
| 4,919,545 A | 4/1990 | Yu | |
| 4,977,594 A | 12/1990 | Shear | |
| 4,995,080 A | 2/1991 | Bestler et al. | |
| 5,008,853 A | 4/1991 | Bly et al. | |
| 5,029,207 A | 7/1991 | Gammie | |
| 5,036,461 A | 7/1991 | Elliott et al. | |
| 5,046,093 A | 9/1991 | Wachob | |
| 5,060,262 A | 10/1991 | Bevins, Jr et al. | |
| 5,077,665 A | 12/1991 | Silverman et al. | |
| 5,083,309 A | 1/1992 | Beysson | |
| 5,091,938 A | 2/1992 | Thompson et al. | |
| 5,113,518 A | 5/1992 | Durst, Jr. et al. | |
| 5,126,566 A | 6/1992 | Shimada | |
| 5,138,659 A | 8/1992 | Kelkar et al. | 380/20 |
| 5,142,579 A | 8/1992 | Anderson | |
| 5,144,663 A | 9/1992 | Kudelski et al. | |
| 5,146,497 A | 9/1992 | Bright | |
| 5,157,726 A | 10/1992 | Merkle et al. | |
| 5,163,096 A | 11/1992 | Clark et al. | |
| 5,173,939 A | 12/1992 | Abadi et al. | |
| 5,204,961 A | 4/1993 | Barlow | |
| 5,220,604 A | 6/1993 | Gasser et al. | |
| 5,224,163 A * | 6/1993 | Gasser et al. | 380/30 |
| 5,227,893 A | 7/1993 | Ett | |
| 5,235,641 A * | 8/1993 | Nozawa et al. | 380/21 |
| 5,247,575 A | 9/1993 | Sprague et al. | |
| 5,270,773 A * | 12/1993 | Sklut et al. | 399/20 |
| 5,291,598 A | 3/1994 | Grundy | |
| 5,301,245 A | 4/1994 | Endoh | 380/10 |
| 5,315,657 A | 5/1994 | Abadi et al. | |
| 5,319,705 A | 6/1994 | Halter et al. | |
| 5,323,464 A | 6/1994 | Elander et al. | |
| 5,341,425 A | 8/1994 | Wasilewski et al. | |
| 5,345,508 A | 9/1994 | Lynn et al. | 380/46 |
| 5,347,581 A | 9/1994 | Naccache et al. | |
| 5,349,662 A | 9/1994 | Johnson et al. | |
| 5,353,351 A | 10/1994 | Bartoli et al. | 380/33 |
| 5,369,702 A | 11/1994 | Shanton | |
| 5,375,240 A | 12/1994 | Grundy | |
| 5,381,480 A | 1/1995 | Butter et al. | 380/37 |
| 5,390,297 A | 2/1995 | Barber et al. | |
| 5,392,351 A | 2/1995 | Hasebe et al. | 380/4 |
| 5,400,403 A * | 3/1995 | Fahn et al. | 380/21 |
| 5,410,602 A | 4/1995 | Finkelstein et al. | |
| 5,414,772 A | 5/1995 | Naccache et al. | |
| 5,428,606 A | 6/1995 | Moskowitz | |
| 5,428,685 A | 6/1995 | Kadooka | |
| 5,438,508 A | 8/1995 | Wyman | |
| 5,442,706 A | 8/1995 | Kung | |
| 5,444,779 A * | 8/1995 | Daniele et al. | 713/179 X |
| 5,444,782 A | 8/1995 | Adams, Jr. et al. | |
| 5,450,493 A | 9/1995 | Maher | |
| 5,453,601 A | 9/1995 | Rosen | |
| 5,455,863 A | 10/1995 | Brown et al. | |
| 5,455,941 A | 10/1995 | Okuno et al. | |
| 5,457,746 A * | 10/1995 | Dolphin | 380/4 |
| 5,465,299 A * | 11/1995 | Matsumoto et al. | 380/23 |
| 5,475,757 A | 12/1995 | Kelly | |
| 5,475,758 A | 12/1995 | Kikuchi | |
| 5,479,514 A | 12/1995 | Klonowski | |
| 5,485,577 A | 1/1996 | Eyer et al. | 395/188.01 |
| 5,490,216 A | 2/1996 | Richardson | |
| 5,495,533 A * | 2/1996 | Linehan et al. | 380/21 |
| 5,497,420 A | 3/1996 | Garneau et al. | |
| 5,499,298 A * | 3/1996 | Narasimhalu et al. | 705/54 |
| 5,499,340 A | 3/1996 | Barritz | |
| 5,504,816 A | 4/1996 | Hamilton et al. | 380/20 |
| 5,504,817 A | 4/1996 | Shamir | |
| 5,504,818 A * | 4/1996 | Okano | 380/49 |
| 5,504,933 A | 4/1996 | Saito | |
| 5,509,073 A * | 4/1996 | Monnin | 380/229 |
| 5,509,074 A | 4/1996 | Choudhury et al. | |
| 5,511,121 A | 4/1996 | Yacobi | |
| 5,515,441 A | 5/1996 | Faucher | |
| 5,515,538 A | 5/1996 | Kleiman | |
| 5,530,752 A | 6/1996 | Rubin | |
| 5,532,920 A | 7/1996 | Hartrick et al. | |
| 5,541,994 A | 7/1996 | Tomko et al. | |
| 5,553,145 A | 9/1996 | Micali | |
| 5,553,281 A | 9/1996 | Brown et al. | |
| 5,577,121 A | 11/1996 | Davis et al. | |
| 5,579,223 A | 11/1996 | Raman | |
| 5,581,682 A | 12/1996 | Anderson et al. | |
| 5,584,023 A | 12/1996 | Hsu | |
| 5,604,800 A | 2/1997 | Johnson et al. | |
| 5,606,609 A | 2/1997 | Houser et al. | |
| 5,606,613 A | 2/1997 | Lee et al. | 380/21 |
| 5,633,934 A | 5/1997 | Hember | |
| 5,636,277 A | 6/1997 | Nagahama | |
| 5,642,418 A | 6/1997 | Farris et al. | |
| 5,646,997 A | 7/1997 | Barton | |
| 5,646,999 A * | 7/1997 | Saito | 380/25 |
| 5,651,064 A | 7/1997 | Newell | |
| 5,666,411 A | 9/1997 | McCarty | |
| 5,680,452 A | 10/1997 | Shanton | |
| 5,689,587 A | 11/1997 | Bender | |
| 5,706,210 A | 1/1998 | Kumano et al. | |
| 5,715,393 A | 2/1998 | Naugle | |
| 5,740,246 A | 4/1998 | Saito | |
| 5,745,572 A | 4/1998 | Press | |
| 5,765,152 A | 6/1998 | Erickson et al. | |
| 5,765,176 A | 6/1998 | Bloomberg | |
| 5,771,383 A | 6/1998 | Magee et al. | |
| 5,794,115 A | 8/1998 | Saito | |
| 5,812,762 A | 9/1998 | Kim | |
| 5,818,933 A | 10/1998 | Kambe et al. | |
| 5,825,892 A | 10/1998 | Braudaway | |
| 5,832,083 A | 11/1998 | Iwayama et al. | |
| 5,835,601 A | 11/1998 | Shimbo et al. | |
| 5,835,765 A | 11/1998 | Matsumoto | |
| 5,841,886 A | 11/1998 | Rhoads | |
| 5,848,155 A | 12/1998 | Cox | |
| 5,848,158 A | 12/1998 | Saito | |
| 5,864,683 A | 1/1999 | Boebert et al. | |

| | | | | | | |
|---|---|---|---|---|---|---|
| 5,867,579 | A | 2/1999 | Saito | EP | 0 649 074 | 4/1995 |
| 5,889,868 | A | 3/1999 | Moskowitz | EP | A649074 | 4/1995 |
| 5,901,339 | A | 5/1999 | Saito | EP | 0665486 | 8/1995 |
| 5,910,987 | A | 6/1999 | Ginter et al. | EP | 0430734 B1 | 9/1995 |
| 5,912,969 | A * | 6/1999 | Sasamoto et al. ............. 705/57 | EP | 0354774 B1 | 4/1996 |
| 5,968,175 | A * | 10/1999 | Morishita et al. ........... 713/200 | EP | 0715243 | 6/1996 |
| 5,974,141 | A | 10/1999 | Saito | EP | 0450841 B1 | 8/1996 |
| 5,982,891 | A | 11/1999 | Ginter et al. | EP | 0506435 B1 | 10/1996 |
| 5,986,690 | A | 11/1999 | Hendricks | EP | 0489385 B1 | 3/1997 |
| 6,002,772 | A | 12/1999 | Saito | EP | 0438154 B1 | 7/1997 |
| 6,006,328 | A | 12/1999 | Drake | EP | 0813133 A2 | 12/1997 |
| 6,026,430 | A | 2/2000 | Butman et al. | EP | 0677949 B1 | 5/2003 |
| 6,044,367 | A | 3/2000 | Wolff | EP | 0719045 B1 | 10/2003 |
| 6,069,952 | A | 5/2000 | Saito et al. ..................... 380/4 | EP | 0704785 B1 | 11/2003 |
| 6,076,077 | A | 6/2000 | Saito | EP | 0715241 B1 | 1/2004 |
| 6,081,794 | A | 6/2000 | Saito | EP | 0746126 B1 | 12/2004 |
| 6,091,835 | A | 7/2000 | Smithies et al. | EP | 0709760 B1 | 5/2006 |
| 6,097,816 | A | 8/2000 | Saito | GB | 2231244 | 11/1990 |
| 6,097,818 | A | 8/2000 | Saito | JP | 59169000 | 9/1984 |
| 6,128,605 | A | 10/2000 | Saito et al. | JP | 60102038 | 6/1985 |
| 6,160,891 | A | 12/2000 | Al-Salqan | JP | 62-169540 | 7/1987 |
| 6,182,218 | B1 | 1/2001 | Saito | JP | 64-041387 | 2/1989 |
| 6,209,092 | B1 | 3/2001 | Linnartz | JP | 64-061782 | 8/1989 |
| 6,226,618 | B1 | 5/2001 | Downs et al. | JP | 3128541 | 5/1991 |
| 6,272,635 | B1 | 8/2001 | Saito | JP | 3265241 | 11/1991 |
| 6,408,390 | B1 | 6/2002 | Saito | JP | 03-282989 | 12/1991 |
| 6,415,271 | B1 | 7/2002 | Turk et al. | JP | 4181282 | 6/1992 |
| 6,424,715 | B1 | 7/2002 | Saito | JP | 4268844 | 9/1992 |
| 6,438,694 | B2 | 8/2002 | Saito | JP | 5056037 | 3/1993 |
| 6,449,717 | B1 | 9/2002 | Saito | JP | 5063142 | 3/1993 |
| 6,463,536 | B2 | 10/2002 | Saito | JP | 5075597 | 3/1993 |
| 6,519,623 | B1 | 2/2003 | Mancisidor | JP | 05-122701 | 5/1993 |
| 6,560,339 | B1 | 5/2003 | Iwamura | JP | 5276476 | 10/1993 |
| 6,574,609 | B1 | 6/2003 | Downs et al. | JP | 05-298373 | 11/1993 |
| 6,603,864 | B1 | 8/2003 | Matsunoshita | JP | 5316102 | 11/1993 |
| 6,615,258 | B1 | 9/2003 | Barry et al. | JP | 5324936 | 12/1993 |
| 6,668,324 | B1 | 12/2003 | Mangold et al. | JP | 5327693 | 12/1993 |
| 6,721,887 | B2 | 4/2004 | Saito | JP | 5334324 | 12/1993 |
| 6,741,991 | B2 | 5/2004 | Saito | JP | 6095591 | 4/1994 |
| 6,744,894 | B1 | 6/2004 | Saito | JP | 6131806 | 5/1994 |
| 6,789,197 | B1 | 9/2004 | Saito | JP | 6231536 | 8/1994 |
| 6,851,053 | B1 | 2/2005 | Liles et al. | JP | 6236147 | 8/1994 |
| 6,874,089 | B2 | 3/2005 | Dick et al. | JP | 6242304 | 9/1994 |
| 7,024,681 | B1 | 4/2006 | Fransman et al. | JP | 6264199 | 9/1994 |
| 7,036,019 | B1 | 4/2006 | Saito | JP | 6264201 | 9/1994 |
| 7,093,295 | B1 | 8/2006 | Saito | JP | 6269959 | 9/1994 |
| 2002/0021807 | A1 | 2/2002 | Saito | JP | 6290087 | 10/1994 |
| 2002/0052850 | A1 | 5/2002 | Saito | JP | 6318036 | 11/1994 |
| 2002/0122173 | A1 | 9/2002 | Saito | JP | 7014045 | 1/1995 |
| 2003/0144963 | A1 | 7/2003 | Saito | JP | 7271865 | 10/1995 |
| 2005/0262023 | A1 | 11/2005 | Saito | JP | 7302244 | 11/1995 |
| | | | | JP | 8185448 | 7/1996 |
| | | FOREIGN PATENT DOCUMENTS | | JP | 8292976 | 11/1996 |
| | | | | WO | WO8503830 | 8/1985 |
| EP | | 0121853 | 10/1984 | WO | WO8909528 | 10/1989 |
| EP | | 0158167 | 10/1985 | WO | WO 9002382 | 3/1990 |
| EP | | 0199410 | 10/1986 | WO | WO9307715 | 4/1993 |
| EP | | 0341801 | 11/1989 | WO | WO 9520291 | 7/1995 |
| EP | | 0391261 A3 | 3/1990 | WO | WO9613113 | 5/1996 |
| EP | | 0 398 645 | 11/1990 | WO | WO9623257 | 8/1996 |
| EP | | A398645 | 11/1990 | WO | WO9627259 | 9/1996 |
| EP | | 0459046 | 12/1991 | WO | WO9750036 | 12/1997 |
| EP | | 0542298 A3 | 11/1992 | | | |
| EP | | 0 518 365 A2 | 12/1992 | | | |
| EP | | 0191162 B1 | 2/1993 | | | |
| EP | | 0532381 | 3/1993 | | | |
| EP | | 0551016 | 7/1993 | | | |
| EP | | 0561685 | 9/1993 | | | |
| EP | | 0 581 227 | 2/1994 | | | |
| EP | | A581227 | 2/1994 | | | |
| EP | | 0 590 763 | 4/1994 | | | |
| EP | | A590763 | 4/1994 | | | |
| EP | | 0421808 B1 | 12/1994 | | | |

OTHER PUBLICATIONS

Encryption of information to be recorded so as to prevent unauthorized playback, p. 219, 2244 Research Disclosure Mar. 1992, No. 335, Emsworth, GB.

Satellite and Cable TV Scrambling and Descrambling, Baylin/Gale Productions, 2$^{nd}$ Edition, © 1986, pp. 163-165.

U.S. Appl. No. 11/556,992, filed Nov. 6, 2006, Saito.

U.S. Appl. No. 11/469,035, filed Aug. 31, 2006, Saito.

U.S. Appl. No. 11/512,885, filed Aug. 29, 2006, Saito.

U.S. Appl. No. 11/512,695, filed Aug. 29, 2006, Saito.
U.S. Appl. No. 11/496,777, filed Jul. 31, 2006, Saito.
U.S. Appl. No. 11/491,400, filed Jul. 20, 2006, Saito.
U.S. Appl. No. 11/480,690, filed Jul. 3, 2006, Saito.
U.S. Appl. No. 11/446,604, filed Jun. 1, 2006, Saito.
U.S. Appl. No. 11/441,973, filed May 25, 2006, Saito.
U.S. Appl. No. 11/404,124, filed Apr. 12, 2006, Saito.
U.S. Appl. No. 11/190,177, filed Jul. 25, 2005, Saito.
Memon, Nasir, et al., "Protecting Digital Media Content" Association for Computing Machinery, Communications of the ACM, New York, Jul. 1998, vol. 41, issue 7, pp. 35-43.
Murphy, Kathleen, "Digimarc Awarded Patent for Digital Watermarking" Business, Mar. 10, 1998, www.internetnews.com/bus-news/article.php/19611, 2 pgs.
Hedberg, S.R. "HP's International Cryptography Framework: Compromise or Threat?" IEEE Computer, Jan. 1997, pp. 28-30.
Zhang, N.X. "Secure Code Distribution" IEEE Computer, Jun. 1997, pp. 76-79.
Anonymous, "Security" Government Executive, National Journal, Inc. Washington, vol. 29, issue 1, Jan. 1997, pp. 35-37.
Wayner, P. "Digital Copyright Protection" AP Professional, 1997, pp. 1-7 and 14-17.
U.S. Appl. No. 10/170,677, filed Jun. 13, 2002, Saito.
U.S. Appl. No. 10/013,507, filed Dec. 13, 2001, Saito.
U.S. Appl. No. 09/985,279, filed Nov. 2, 2001, Saito.
Menezes, Alfred, et al., "Handbook of Applied Cryptography" 1997, sec. 11.5.1, CRC Press, pp. 452-454.
Fitch, K. "User Authentication and Software Distribution on the Web", ausweb97@scu.edu.au Nov. 5, 1996, pp. 1-12.
Rubin, A.D., "Trusted Distribution of Software Over the Internet" Network and Distributed System Security, Feb. 16-17, 1995, San Diego, California, pp. 47-53.
U.S. Appl. No. 09/665,902, filed Sep. 20, 2000, Saito.
U.S. Appl. No.09/476,334, filed Jan. 30, 2000, Saito.
Bryan, John "A look at five different firewall products and services you can install today" www.byte.com/art/9504/sec10/art6.htm, Apr. 1995.
Rubin, A.D., "Secure Distribution of Electronic Documents in an Hostile Environment" Computer Communications, vol. 18, No. 6, Jun. 1995, pp. 429-434.
Bellovin, S.M. et al., "Network Firewalls" IEEE Communications Magazine, vol. 32, No. 9, Oct. 1994, pp. 50-57.
U.S. Appl. No. 09/362,955, filed Jul. 30, 1999, Saito.
Rozenblit, M. "Secure Software Distribution" IEEE Network Operations and Management Symposium, vol. 2, Feb. 14-18, 1994, pp. 486-496.
Van Schyndel, R.G., et al., "A Digital Watermark" IEEE, Australia, 1994, pp. 86-90.
Medvinsky, Gennady et al., "NetCash: A design for practical electronic currency on the Internet" University of Southern California Information Science Institute, Nov. 1993, pp. 2-7.
Lennil, P. "The IBM Microkernel Technology," OS/2 Developer, vol. 5, Nov. 1, 1993 (pp. 70-72, 74) XP000672962.

Seki, Kazunori et al., "A Proposal of a New Distribution Scheme for Software Products", Keio Department of Instrumentation Engineering, Faculty of Science and Technology, Keio University, Research report made at the information Processing Association, Japan, Jul. 20, 1993, vol. 93, No. 64, pp. 19-28.
Vigarie, J. "A Device for Real-Time Modification of . . . " 18th International Television Symposium and Technical Exhibition, Montreaux, Switzerland, Jun. 10-15, 1993, pp. 761-768.
U.S. Appl. No. 08/846,661, filed May 1, 1997, Saito.
Neuman, Clifford B., Proxy-Based Authorization and Accounting for Distributed Systems, Proceedings of the 13th International Conference on Distributed Computing Systems, May 1993, pp. 283-291.
Harn, Lein, et al., "Software Authentication System for Information Integrity" Computers & Security International Journal Devoted to the Study of Technical and Financial Aspects of Computer Security, vol. II, Dec. 1, 1992, pp. 747-752, XP000332279.
Masuoka, Fujio, Progressing Flash Memories Kogyo Chosa-kai Co., Chapter 1: Semiconductor Memory, pp. 34-68.
U.S. Appl. No. 08/733,504, filed Oct. 18, 1996, Saito.
Tatsuaki Okamoto, "Universal Electronic Cash", Technical Report of Institute of Electronics, Information and Communication Engineers (IEICE) Jul. 15, 1991, vol. 91, No. 127, pp. 39-47.
Komatsu, Naohisa, et al., "A Proposal on Digital Watermark in Document Image Communication and its Application to Realizing a Signature" Electronics & Communications in Japan Part 1—Communications, vol. 73, No. 5, part I, May 1, 1990, pp. 22-33.
Matsumoto, Tsutomu et al., "Cryptographic Key Sharing" Technical Report of Institute of Electronics, Information and Communication Engineers (IEICE), Mar. 27, 1990, vol. 89, No. 482, pp. 33-47.
Morizaki, H., "Introduction to Electronic Devices" Gijustsu Hyoron Publishing Co., 1989, pp. 260-266.
Grampp, F.T. et al., "Unix Operating System Security" AT&T Bell Laboratories Technical Journal, vol. 63, No. 8, Oct. 1984, New York, pp. 1649-1672.
Adachi, R., "Introduction to handcraft of Personal Computer" Natsume Publishing Co., 1983, pp. 141-155.
"Des Modes of Operation" U.S. FIPS Publication 81, Dec. 2, 1980, 23 pgs.
U.S. Appl. No. 11/701,943, filed Feb. 1, 2007.
U.S. Appl. No. 11/701,945, filed Feb. 1, 2007.
U.S. Appl. No. 11/701,946, filed Feb. 1, 2007.
Search Report dated Oct. 24, 2002.
Ohtaki, Yasuhiro et al., "Cryptographic Management for Superdistribution" Technical Research Report of Electronic Information Communication Association, Mar. 8, 1991, vol. 90, No. 460, pp. 33-42.
Kent, Stephen T., "Internet Privacy Enhanced Mail," Association for Computing Machinery, Communications of the ACM, Aug. 1993, vol. 36, issue 9, pp. 48-61.
Tirkel, A.Z. et al., "Electronic Water Mark," Conference Proceedings Dicta, Dec. 1993, pp. 666-673.

* cited by examiner

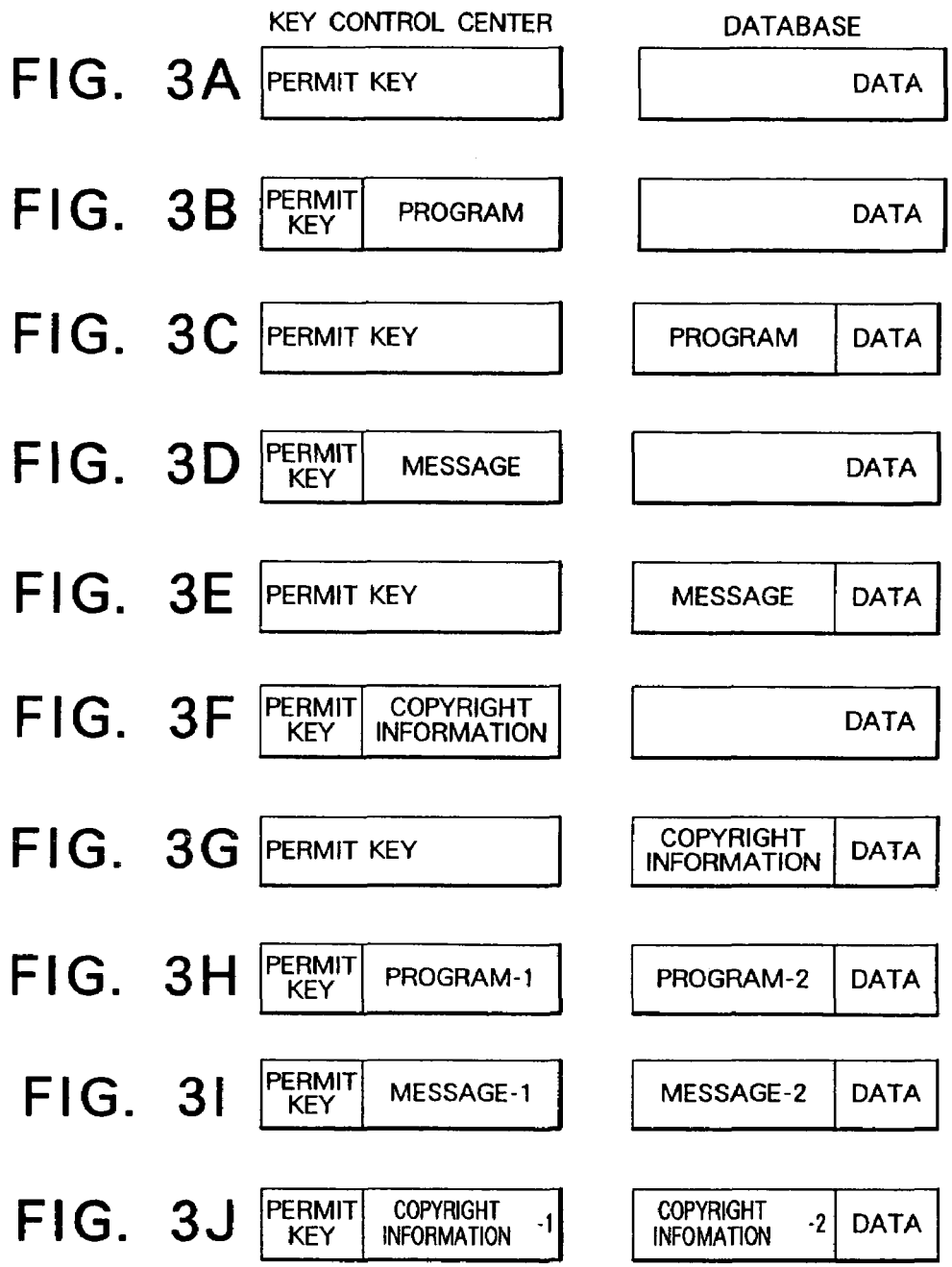

METHOD FOR CONTROLLING DATABASE COPYRIGHTS

This is a continuation of application Ser. No. 08/416,037 filed on Mar. 31, 1995 now abandoned.

BACKGROUND OF THE INVENTION

1. Field of the Invention

The present invention relates to a method for controlling copyrights on utilizing, storing, copying, editing and transferring of digital data, and in particular, to an application of the method to a multimedia system.

2. Background Art

In the information oriented society of today, database systems are becoming wide spread in which it is possible to use various types of data, stored independently by each computer in the past, by connecting computers via communication lines.

In such a database system, the information handled up to this point has been conventionally coded information that can be processed by computer, and that contains a relatively small amount of information and monochrome binary data, such as facsimile information at the most. It is not possible to handle data containing a relatively large amount of information, such as data for natural pictures or animation.

With the rapid progress of digital processing techniques for various types of electrical signals, a technique is under development for digital processing of picture signals other than binary data, handled only as analog signals in the past.

By digitizing the picture signal, it is possible to handle a picture signal, such as, a television signal, by computer. As a technique of the future, attention is now focused on "multimedia systems", which can simultaneously handle the data processed by computers and digitized picture data. Because the picture data contains an overwhelmingly large amount of information compared with character data and audio data, it is difficult to store, transfer or process the picture data by computer. For this reason, techniques for compressing and expanding picture data have been developed. Further, several standards for compression/expansion of picture data have been established. For example, the following standards have been established as common standards: JPEG (Joint Photographic image coding Experts Group) standards for still pictures, H.261 standards for television conferences, MPEG1 (Moving Picture image coding Experts Group 1) standards for picture accumulation, and MPEG2 standards to cope with current television broadcasting and high definition television broadcasting. By implementing these new techniques, it is now possible to transmit digital picture data in real time.

For analog data, which has been widely used in the past, the control of copyrights during processing has not been an important issue because the quality of the analog data deteriorates each time the data is stored, copied, edited or transferred. However, the quality of digital data does not deteriorate even when the data is repeatedly stored, copied, edited or transferred. Therefore, the management and control of copyrights during processing of digital data is an important issue.

Up to now, there has been no adequate method for management and control of copyrights for digital data. It has been managed and controlled merely by copyright law or by contracts. In copyright law, only compensation for digital sound and picture recording devices has been prescribed.

It is possible not only to refer to the content of a database, but also to effectively utilize the data obtained from the database by storing, copying or editing the data, and also transferring the edited data to other persons or to the database with the edited data registered as new data.

In a conventional database system, only character data is handled. However, in multimedia systems, sound data and picture data, which are originally analog data, are digitized and used as part of the database in addition to the other data in the database, such as character data.

Under such circumstances, it is an important question as to how to handle copyrights of the data in the database. However, there are no means in the prior art for copyright management and control of such actions as copying, editing, transferring, etc., of data.

A system for executing copyright control by using encrypted data and obtaining a permit key from a key control center via public telephone lines is disclosed in Japanese Patent Application 4-199942 (U.S. Ser. No. 08/098,415) and Japanese Patent Application 4-289074 (U.S. Ser. No. 08/143,912) of the present inventors. A device for this purpose is disclosed in Japanese Patent Application 4-276941 (U.S. Ser. No. 08/135,634), also of the present inventors.

SUMMARY OF THE INVENTION

It is an object of the present invention to provide a method for controlling copyrights in the display (including the process of providing sound), storage, copying, editing and transfer of digital data in a database system including real time transmission of digital pictures.

For the control of copyrights in the database system to which the present invention is applied, it is essential to transmit one or more of copyright information; i.e., messages of copyright control, information about copyrights and a program for controlling copyrights, when necessary, in addition to a key for enabling users who wish to use encrypted data.

The copyright control message is displayed on a screen and advises or warns the user if the data is being utilized in a manner inconsistent with the conditions of the user's request or permission. The copyright control program watches and controls data use so that the data is not utilized beyond the conditions of the user's request or permission.

The copyright control program, the copyright information and the copyright control message are supplied together with a permit key in some cases, but they may also be supplied together with data in other cases. It is also possible to supply a part of them together with the permit key, and to supply the other part with the data.

For the data, the permit key, the copyright control message, the copyright information and the copyright control program, there are the following three cases: they are transmitted in encrypted form and decrypted upon use; they are transmitted in encrypted form and decrypted only when they are displayed; or they are not encrypted at all.

BRIEF DESCRIPTION OF THE DRAWINGS

FIG. 3A to FIG. 3J illustrate embodiments of the present invention.

DETAILED DESCRIPTION

In the following, description will be given on embodiments of the present invention.

As shown in FIG. 3A, the permit key and database data may be obtained via different communication routes, with the permit key being obtained from a key control center via public telephone lines. However, if a charging method is arranged, it is also possible to obtain the permit key via the same communication system through which the database data is supplied.

Previous systems have not considered secondary exploitation of copyrighted data, such as forms of use involving storing, copying, editing, transferring, etc. of data. Also, these previous systems do not consider distribution of data outside a LAN to which the users belong. Therefore, these previous systems are not adequate to cope with secondary exploitation of data unless the users of the data choose to honor the copyright of the data.

To cope with various forms of the secondary exploitation as described above, in the present invention, a plurality of permit keys are prepared to match each form of use, and no utilization is possible unless there is a permit key suitable for the desired form of use. As to the forms of use available for a database, there are display, storage, copying, edit, transfer, etc. Examples of implementing these forms of use in accordance with an embodiment of the invention are shown in FIGS. 4A-4E. In these Figures, double-framed parts show that data is encrypted.

Figure 4A:
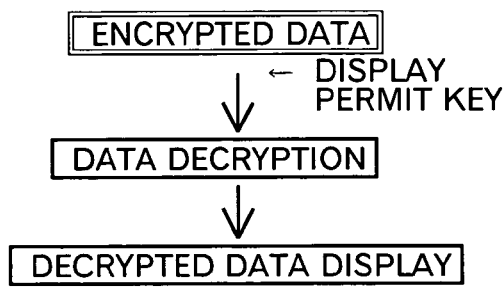
FIGS. 4A-4E illustrate structures of embodiments of the present invention.

FIG. 4A illustrates the case in which the encrypted data supplied to a user is displayed. The encrypted data is first decrypted by a display permit key, and the data thus decrypted is displayed.

Figure 4B:
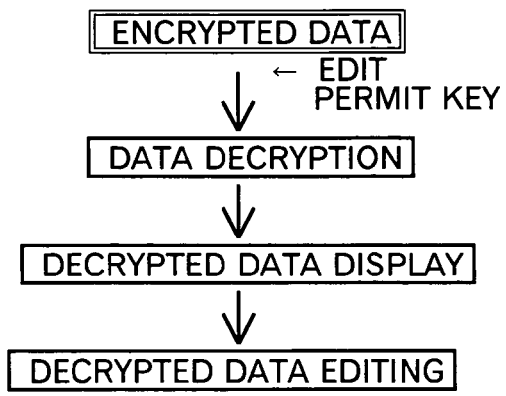

FIG. 4B illustrates the case in which the encrypted data supplied to the user is edited. The encrypted data is first decrypted by an edit permit key, and the data thus decrypted is displayed. Subsequently, editing is performed on the decrypted data.

Figure 4C:
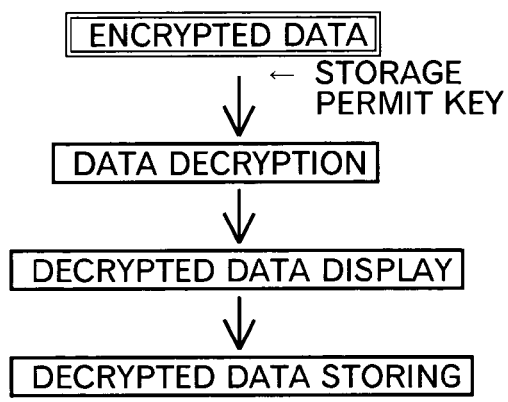

FIG. 4C illustrates the case in which the encrypted data supplied to the user is stored. The encrypted data is first decrypted by a storage permit key, and the data thus decrypted is displayed. Subsequently, the decrypted data is stored.

Figure 4D:
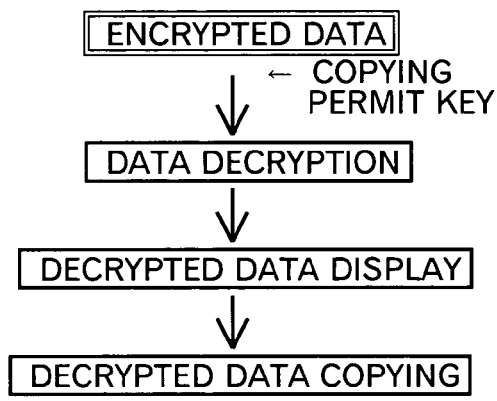

FIG. 4D illustrates the case in which the encrypted data supplied to the user is copied. The encrypted data is first decrypted by a copy permit key, and the data thus decrypted is displayed. Subsequently, the decrypted data is copied.

Figure 4E:
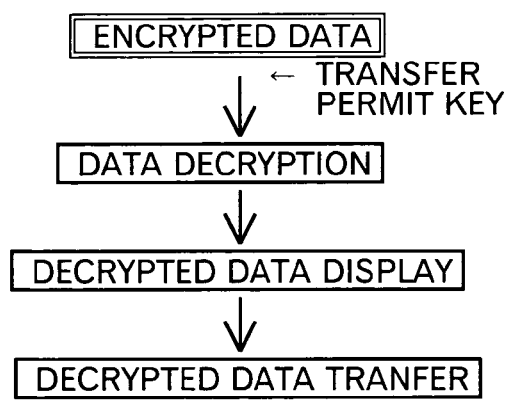

FIG. 4E illustrates the case in which the encrypted data supplied to the user is transferred. The encrypted data is first decrypted by a transfer permit key, and the data thus decrypted is displayed. Subsequently, the decrypted data is transferred. The permit keys suitable for these forms of use should be prepared. However, in the case where the ability to execute several forms of use at the same time is desired, it is necessary to obtain a plurality of permit keys. If the user fails to obtain the permit keys, the desired form of use may not be executed.

To avoid such situations, a permit key can be used which makes it possible to execute several forms of use. Hierarchical permit keys can be used such that an upper level key also fulfills the function of a lower level key. For example, from lower level to upper level, the hierarchy is defined as: display<storage<copying<edit<transfer. With the display permit key, only display operations can be executed. Display and storage operations can be executed by the storage permit key. Display, storage and copying operations can be executed by the copying permit key. Display, storage, copying and edit operations can be executed by the edit permit key. Display, storage, copying, edit and transfer operations can be executed by the transfer permit key.

On the relation of keys, it is possible to order key hierarchy from lower-level to upper-level in the order of: storage<copying<transfer<display<edit. Specifically, the order is set in such manner that storage operations can be executed by a storage permit key; storage and copying operations can be executed by a copying permit key; storage, copying and transfer operations can be executed by a transfer permit key; storage, copying, transfer and display operations can be executed by a display permit key; and storage, copying, transfer, display and edit operations can be executed by an edit permit key.

In this system, storage, copying and transfer are placed at a lower level than display because, even when storage, copying and transfer operations are executed on the data, it is difficult and meaningless to utilize the data since it cannot be displayed. It is necessary to display the data in order to utilize the data. This hierarchical arrangement is best suited to a system, in which encrypted data are supplied and are utilized using a permit key.

The permit key is usually offered to the user on payment basis. Therefore, except where data utilization is unlimited, the number of times the permit key may be used is limited to one time or several times Because the data can be used if there is a permit key, it is possible to use the data beyond the permitted range if the permit key is duplicated or falsified. To prevent this, the permit key is encrypted.

In an embodiment of the invention, copyright control is enforced by a copyright control program. The forms of use which are allowed or prohibited by the copyright control program include storing, displaying, copying, editing, transferring, etc. of data. In the case where it is necessary to limit the number of usage times or the forms of use, a message for such purpose may be displayed by the program. Information on the original copyright, and subsequent copyrights for subsequent editions, may be given to the data to ensure complete copyright control. Thus, damage to a data supplier or user, due to falsification of copyright information, is prevented.

In a conventional database system, the data itself is offered in a completely defenseless state. Therefore, copyright control can be executed only when data is taken out of the database. In the subsequent copyright control, there is no other way but to rely on the conscience of the user and to take necessary measures when the data is utilized beyond the permitted range of use.

For this reason, in an embodiment of the invention, the data supplied from the database is left in an encrypted state, and storage is executed under this condition. In addition, copying and transfer are also executed in the encrypted state. Decrypting is performed only in display and edit operations, and these are controlled by the copyright control program. Examples of implementing each form of use in accordance with another embodiment of the invention are shown in FIGS. 5A to 5E. In these Figures, double-framed parts show that data is with encrypted.

Figure 5A:
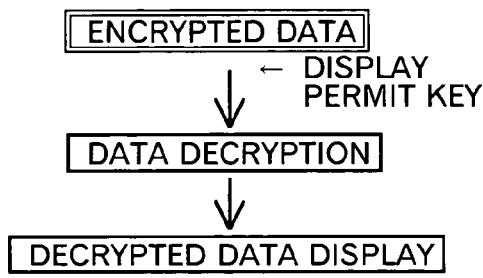
FIGS. 5A-5E illustrate structures of embodiments of the present invention.

FIG. 5A illustrates the case in which the encrypted data supplied to the user is displayed. The encrypted data is decrypted by a display permit key, and the data thus decrypted is displayed.

Figure 5B:
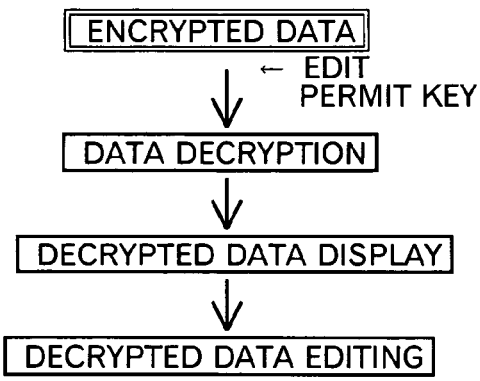

FIG. 5B illustrates the case in which the encrypted data supplied to the user is edited. The encrypted data is decrypted using an edit permit key, and the data thus decrypted is displayed. Subsequently, the decrypted data is edited.

Figure 5C:
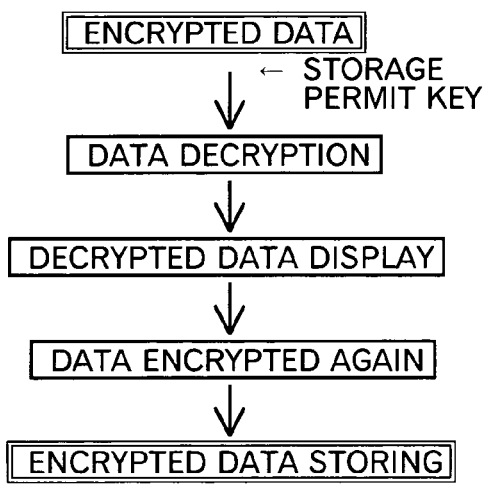

FIG. 5C illustrates the case in which the encrypted data supplied to the user is stored. The encrypted data is decrypted using a storage permit key, and the data thus decrypted is displayed. Prior to storing the data, the data is encrypted again using the storage permit key. Thus, in this embodiment, the data cannot be stored in the decrypted state.

Figure 5D:
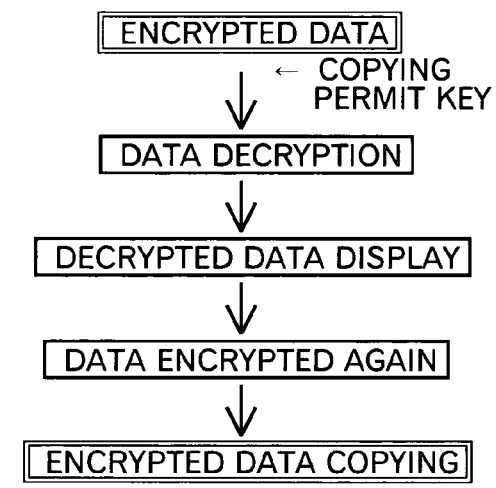

FIG. 5D illustrates the case in which the encrypted data supplied to the user is copied. The encrypted data is decrypted by a copy permit key, and the data thus decrypted is displayed. Prior to copying of the data, the data is encrypted again using the copy permit key. Thus, in this embodiment, the data cannot be copied in the decrypted state.

Figure 5E:
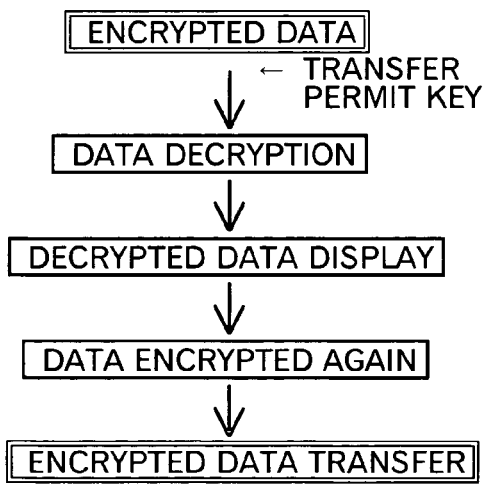

FIG. 5E illustrates the case in which the encrypted data supplied to the user is transferred. The encrypted data is decrypted by a transfer permit key, and the data thus decrypted is displayed. Prior to transferring the data, the data is encrypted again using the transfer permit key. Thus, in this embodiment, the data cannot be transferred in the decrypted state. In so doing, it is impossible to use the data beyond the permitted range. In this case, the copyright control program may be integrated with the data or may be encrypted.

Because the copyright control program is encrypted and the permit key decrypts the copyright control program, and because the copyright control program decrypts and encrypts the data, the data is encrypted twice.

In this case, if a crypt key unique to the data is added to the copyright control program for the purpose of encrypting the data, it is impossible to decrypt the data if the copyright control program is separated from the data.

In this copyright control program, even if the data is stored, copied or transferred within the permitted range of use, and if these operations are executed after the data and the copyright control program have been encrypted, it is impossible to use the data in an undesired manner.

If an operator uses a computer program inadequately and, as a result, the computer does not respond any more or computer operation is stopped, an error message is displayed so that the operator may known the cause. Similarly, if a user of the database erroneously uses the data beyond the permitted range of the permit key, and, as a result, the computer does not respond or operation is stopped, the user cannot understand the cause. In this case, a copyright control message is displayed by the copyright control program.

The display of the copyright control message as described above also fulfills the function of providing a warning if the user intentionally uses the data beyond the range of use permitted by the permit key.

In general, various programs are incorporated into readonly memory (ROM) inside the equipment which the user uses, or the programs are supplied from software. When the programs are incorporated into ROM, there is no possibility that the programs may be changed. However, the equipment is limited to systems that contain the ROM. On the other hand, when the programs are supplied from software, there is no system limitation if the programs are transferred. However, there is a possibility that the programs may be altered. To prevent alteration of the copyright control program in the present invention, the copyright control program should be encrypted.

The database is utilized by various users using various types of devices. Therefore, if the programs for controlling copyrights are supplied as software, it is necessary to cope with various types of devices. In this case, it is necessary to modify the program according to the device that the user uses. In one embodiment of the invention, a translation program to translate the copyright control program is provided in the communication software of the device which the user uses. The copyright control program can then be translated by the translation program so that it suits the device.

Even though the permit key for using the database may become more complicated due to encryption, a data size of several tens of bites is sufficient. Therefore, the time required for transmitting the permit key is far shorter than one second. In other words, even when a payment-based public telephone line is used and other information is transmitted together with the permit key, the increase in cost is negligible. Therefore, as shown in FIG. 3B, when transmitting the permit key, the copyright control program may also be transmitted utilizing surplus time.

In FIG. 3C, the copyright control program is supplied together with the data, and the entire data utilization process is placed under control of the copyright control program. For example, the data supplied in encrypted form cannot be decrypted unless the copyright program supplied with it is used. If there is no such copyright control program, the data cannot be used. Thus, integration of the copyright control program with the data further reinforces copyright control.

Description will now be provided on the supply of copyright control messages.

The following are some examples of the copyright control message:

"Need a display permit key."
"Need a storage permit key."
"Need a copying permit key."
"Need an edit permit key."
"Need a transfer permit key."

Some other examples are:

"Display unavailable."
"Storage unavailable."
"Copy unavailable."
"Edit unavailable."
"Transfer unavailable."

Figure 1A:
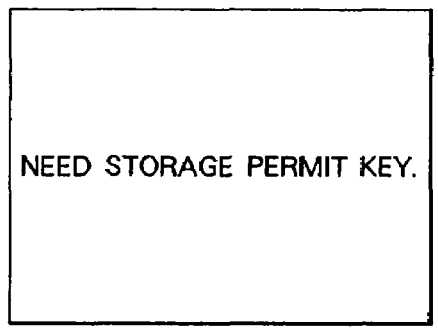
FIG. 1A and FIG. 1B illustrate examples of display messages of the present invention.
Figure 1B:
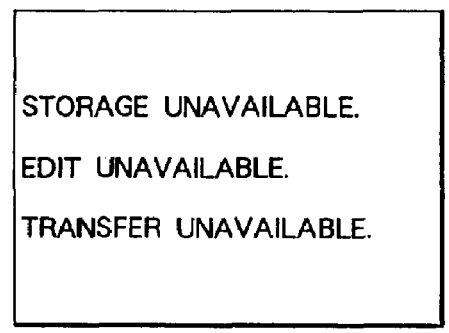

These copyright control messages are displayed alone as shown in FIG. 1A or in combination as shown in FIG. 1B.

To display the copyright control message, the message must be stored in the memory of the device which the user uses. The memory in the device is classified as ROM and random-access memory (RAM).

The method of storing the message in ROM is reliable, but there is a limitation to the device because the user must use the ROM wherein the copyright control messages are stored.

As for methods for storing messages in RAM, there is a method for supplying messages together with the permit key, a method for supplying messages together with the copyright control program, and a method for supplying messages together with the data. When the permit key and the copyright control program are supplied at the same time, the copyright control message can also be supplied at the same time.

The copyright control message is not effective unless an adequate message is displayed. For this reason, the copyright control message cannot play its designed role if the message is changed in such a manner that no substantial content is displayed, or further, if its content is deleted such that nothing is displayed. To prevent this trouble, the message is encrypted.

The display of the copyright control message is executed by the copyright control program. The modes of display are as follows. (1) When an operation is attempted with no adequate key available, a corresponding message is displayed. (2) All messages corresponding to operations available for the current permit key are displayed, if an operation is attempted without an available permit key.

The copyright control message is supplied together with the permit key as shown in FIG. 3D, or together with the data as shown in FIG. 3E.

The copyright control message is transmitted by transmitting all messages or only the necessary messages required. In the former case, the quantity of information is relatively large, but security is high. In the latter case, the quantity of information is relatively small, but security is low.

It is desirable that the copyright control message be inseparable from the data, as in the case of the copyright control program. This may be facilitated by integrating the copyright control message with the copyright control program.

To display the copyright on printed matter, the name of the author and the date are used. The copyright of the database is displayed by entering information such as the name of the author and the date.

As described above, edit and up-load of edited data are included in the use of the data in the database. Specifically, the presence of secondary data, which is edited from the data, i.e. a work of authorship, is recognized. To ensure the copyright of the data in this context, it is necessary to store the information on original authorship and secondary authorship together with the data. When the data is used in a manner other than for down-loading and display, copyright information including information on the operator, in addition to the copyright information stored up to that moment, is stored together with the data as history.

In this case, only the person who controls the database can put the original authorship into the database as primary data. All data handled by other than the person in charge of database control is considered secondary data. Control of the data history is therefore further reinforced.

When the copyright information is separated from data which is a work of authorship, it becomes extremely difficult to recognize the copyright. Thus, it is necessary that the copyright information be inseparable from the data.

To prevent separation of the copyright information from the data, a method for integrating the data with the copyright information or a method for making the data unusable without copyright information are described. These methods are similar to the methods described above for the copyright control program and the copyright control message.

First, description will be given for a method for integrating the data with the copyright information.

The data handled by computer comprises a file header indicating data name and size, and a file body, which comprises the main body of data. Therefore, for integrating the data with the copyright information, there are methods that integrate the copyright information with the file header, that integrate the copyright information with the file body, and that use other means for this purpose.

Among these methods, for the method that integrates the copyright information the with file header, if the data is character information expressed with character code the copyright information may be integrated even without a file header. Thus, the method is simple, but not very reliable. Also, because the capacity of the file header is not high, it is not sufficient if there is a large amount of copyright information.

Digital picture data and digital sound data are grouped together under a common group header. The copyright information can be integrated into this group header. However, there is a problem of header capacity similar to the case for the file header.

For the method of integrating the copyright information with the file body, one way is to add copyright information for each piece of data edited. Another way is to add the copyright information all together.

To add the copyright information for each piece of data edited, the copyright information is appended to each piece of edited data using a cut-and-paste procedure. This is not only complicated but disadvantageous in that the entire file data becomes too big.

If the picture data indicates the copyright of original authorship, it is easy to identify corresponding data. Thus, it is not always necessary to add the copyright information to each minimum unit of the edited data.

It is also possible to write the copyright information into the copyright control program. In this method, it is difficult to manipulate the copyright information if it is written into the copyright control program integrated with the data as already described.

If the data is a picture signal, it is necessary to have synchronization signal data in order to define scanning line, field and frame. This synchronization signal has high redundancy and is generally represented with variable-length code. Thus, the copyright information can be mixed with the variable-length code. The number of scanning lines is 480 for VGA standards. By utilizing this method, a considerable quantity of information can be mixed into the picture signal.

If the picture data is an animated picture, it is possible to write a sufficient quantity of copyright information using this method. However, if the picture data is a still picture edited by a cut-and-paste procedure, there may not be enough space to add the copyright information.

Figure 2A:
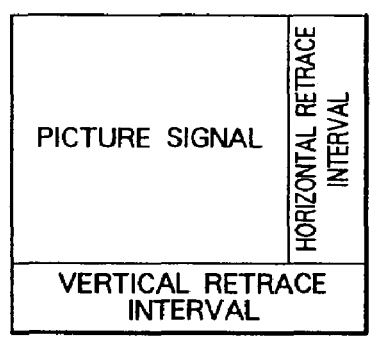
FIG. 2A and FIG. 2B illustrate structures for television signals.
Figure 2B:
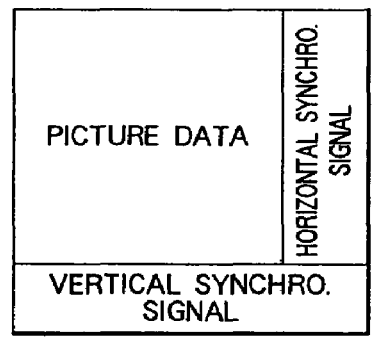

FIG. 2A and FIG. 2B represent structures for an analog television signal and a digital television signal. FIG. 2A represents an analog television signal, and FIG. 2B shows a digital television signal.

A signal containing other than picture data, such as the multiplex teletext signal in analog television, is inserted by utilizing the vertical retrace interval. The horizontal retrace interval is not utilized.

In contrast, in digital television, it is possible for a copyright control program or other multiplex teletext signal to be placed into horizontal scanning data or into vertical scanning data.

As a method for integrating the copyright information with data, one way is to write the copyright information into the data itself, and another is to write it into the control code.

With the data used in a computer, there is control code for controlling the communication system or computer system, in addition to the data to be displayed on screen or used for some operation. This control code cannot be seen by the user. Therefore, if the copyright information is written into the control code, the copyright information thus written does not cause trouble for the user.

It is also possible to enter the copyright information into the files of the computer using the technique of a computer virus without affecting the operation itself.

The copyright information may be supplied together with the permit key as shown in FIG. 3F, or it may be supplied together with data as shown in FIG. 3G.

Attention has been focused in recent years on digital signatures. A digital signature is prepared using a private key, which only the owner knows, and the file size of the document data. If the document data is changed, the change can be confirmed by the private key. The content of the document data can be seen at any time by others using a public key. Thus, this scheme offers very high security.

The data in a computer can be changed without leaving any trace. Because of this, an author may not notice that his copyright is infringed, or a user may use the data without knowing that the content of the data has been changed. To prevent this, a digital signature is attached to the data, and damage to the copyright owner or the user can be avoided.

The permit key, copyright control program, copyright control message, and copyright information can be combined in any way as necessary to actualize the method for controlling database copyrights.

Also, it is possible to design in such a manner that only a part of the data of the copyright control program, the copyright control message or the copyright information is supplied together with the permit key, and the other part is supplied together with the data to be utilized (as shown in FIGS. 3H, 3I and 3J). The part supplied with the permit key and the part supplied together with the data are combined. The functions of the complete permit key may be served after they have been combined together.

Thus, it is possible to give the function of the permit key to the copyright program and copyright control message, and higher security is ensured.

I claim:

1. A method, comprising:
    receiving at a user device one or more of a plurality of utilization permit keys, wherein said plurality of utilization permit keys includes:
        a first utilization permit key capable of use in cryptographic operations and configured to permit one or more of the following uses of digital data: displaying, editing, storing, copying, transferring; and
        a second utilization permit key capable of use in cryptographic operations and configured to permit one or more of the following uses of digital data: displaying, editing, storing, copying, transferring, wherein one or more uses permitted by the second utilization permit key are different from the one or more uses permitted by the first utilization permit key; and
    decrypting encrypted digital data using one or more of the received plurality of utilization permit keys that includes at least the first utilization permit key or the second utilization permit key for performance of only the use or uses of the digital data that are permitted by the received one or more utilization permit keys.

2. A method according to claim 1, wherein the plurality of utilization permit keys include a display permit key permitting only display of the digital data, an edit permit key permitting only display and editing of the digital data, a storage permit key permitting only storage of the digital data, a copy permit key permitting only copying of the digital data, and a transfer permit key permitting only transferring of the digital data.

3. A method according to claim 1, wherein a copyright control program ensures said decrypting is for performance of only the permitted use or uses of the digital data.

4. A method according to claim 1, further comprising displaying a copyright control message by a copyright control program when the user device attempts a use of the digital data that is different from the use or uses of the digital data that are permitted by the received one ore more utilization permit keys.

5. A method according to claim 1, further comprising limiting, by a copyright control program, a number of times the digital data is used by the user device.

6. A method according to claim 1, further comprising limiting, by a copyright control program, a number of times the received one or more utilization permit keys are used for decryption of the encrypted digital data for the permitted use or uses of the digital data.

7. A method according to claim 1, further comprising maintaining, by copyright control program, copyright information on the digital data.

8. A method according to claim 3, further comprising receiving the copyright control program at the user device with the received one or more utilization permit keys.

9. A method according to claim 3, further comprising receiving the copyright control program at the user device with the encrypted digital data.

10. A method according to claim 7, wherein the copyright information includes history information on authorship of the digital data.

11. A method according to claim 1, wherein the one or more of the plurality of utilization permit keys are received from a key control center.

12. A method according to claim 11, further comprising receiving a copyright control program from the key control center at the user device with the received or more utilization permit keys.

13. A method comprising:
    receiving at a user device one or more of a plurality of utilization permit keys, wherein said plurality of utilization permit keys includes:
        a first utilization permit key capable of use in cryptographic operations and configured to permit one or more of the following uses of digital data: displaying, editing, storing, copying, transferring; and
        a second utilization permit key capable of use in cryptographic operations and configured to permit one or more of the following uses of digital data: displaying, editing, storing, copying, transferring, wherein one or more uses permitted by the second utilization permit key are different from the one or more uses permitted by the first utilization permit key;
    decrypting encrypted digital data using one or more of the received plurality of utilization permit keys that include at least the first utilization permit key or the second utilization permit key only when the use or uses of the digital data permitted by the one or more received utilization permit keys are displaying digital data or editing digital data; and
    performing only the use of uses of the digital data that are permitted by the received one or more utilization permit keys.

14. A method according to claim 13, further comprising re-encrypting the decrypted digital data after performance of the use or uses when the permitted use or uses are displaying digital data or editing digital data.

15. A method according to claim 13, wherein the plurality of utilization permit keys include a display permit key permitting only display of the digital data, an edit permit key permitting only display and editing of the digital data, a storage permit key permitting only storage of the digital data, a copy permit key permitting only copying of the digital data, and a transfer permit key permitting only transferring of the digital data.

16. A method according to claim 13, wherein a copyright control program ensures said performing is only of the permitted use or uses of the digital data.

17. A method according to claim 16, further comprising receiving the copyright control program by the user device with the received one or more utilization permit keys.

18. A method according to claim 16, further comprising receiving the copyright control program at the user device with the encrypted digital data.

19. A method according to claim 13, further comprising displaying a copyright control message by a copyright control program when the user device attempts a use of the digital data that is different from the use or uses of the digital data that are permitted by the received one or more utilization permit keys.

20. A method according to claim 13, further comprising limiting, by a copyright control program, a number of times the digital data is used by the user device.

21. A method according to claim 13, further comprising limiting, by a copyright control program, a number of times the received one or more utilization permit keys are used for decryption of the encrypted digital data.

22. A method according to claim 13, further comprising maintaining, by a copyright control program, copyright information on the digital data.

23. A method according to claim 22, wherein the copyright information includes history information on authorship of the digital data.

24. A method according to claim 13, wherein the one or more of the plurality of utilization permit keys are received from a key control center.

25. A method according to claim 24, further comprising receiving a copyright control program from the key control center by the user device with the received one or more utilization permit keys.

26. An apparatus, comprising:
means for receiving by a user device one or more of a plurality of utilization permit keys, wherein said plurality of utilization permit keys includes:
a first utilization permit key capable of use in cryptographic operations and configured to permit one or more of the following uses of digital data: displaying, editing, storing; copying, transferring, and
a second utilization permit key capable of use in cryptographic operations and configured to permit one or more of the following uses of digital data: displaying, editing, storing, copying, transferring; wherein one or more uses permitted by the second utilization permit key are different from the one or more uses permitted by the first utilization permit key; and
means for decrypting encrypted digital data using one or more of the received plurality of utilization permit keys that includes at least the first utilization permit key or the second utilization permit key for performance of only the use or uses of the digital data that are permitted by the one or more received utilization permit keys.

27. The apparatus of claim 26, wherein the plurality of utilization permit keys include a display permit key permitting only display of the digital data, an edit permit key permitting only display and editing of the digital data, a storage permit key permitting only storage of the digital data, a copy permit key permitting only copying of the digital data, and a transfer permit key permitting only transferring of the digital data.

28. The apparatus of claim 26, further comprising means for ensuring said decrypting is for performance of only the use or uses of the digital data that are permitted by the received one or more utilization permit keys.

29. The apparatus of claim 26, further comprising means for displaying a copyright control message when the user device attempts a use of the digital data that is different from the use or uses of the digital data that are permitted by the received one or more utilization permit keys.

30. The apparatus of claim 26, further comprising means for limiting a number of times the digital data is used by the user device.

31. An article comprising: a computer readable storage medium having stored thereon instructions that, if executed by a user device, cause the user device to:
receive one or more of a plurality of utilization permit keys, wherein said plurality of utilization permit keys includes:
a first utilization permit key capable of use in cryptographic operations and configured to permit one or more of the following uses of digital data: displaying, editing, storing, copying, transferring; and
a second utilization permit key capable of use in cryptographic operations and configured to permit one or more of the following uses of digital data: displaying, editing, storing, copying, transferring, wherein one or more uses permitted by the second utilization permit key are different from the one or more uses permitted by the first utilization permit key; and
decrypt encrypted digital data using one or more of the received plurality of utilization permit keys that includes at least the first utilization permit key or the second utilization permit key for performance of only the use or uses of the digital data that are permitted by the one or more received utilization permit keys.

32. The article of claim 31, wherein the plurality of utilization permit keys include a display permit key permitting only display of the digital data, an edit permit key permitting only display and editing of the digital data, a storage permit key permitting only storage of the digital data, a copy permit key permitting only copying of the digital data, and a transfer permit key permitting only transferring of the digital data.

33. The article of claim 31, wherein said instructions, if executed, further cause the user device to ensure said decryption is for performance of only the permitted use or uses of the digital data via a copyright control program.

34. The article of claim 31, wherein said instructions, if executed, further cause the user device to display a copyright control message via a copyright control program when the user device attempts a use of the digital data that is different from the use or uses of the digital data that are permitted by the received one or more utilization permit keys.

35. The article of claim 31, wherein said instructions, if executed, further cause the user device to limit a number of times the digital data is used by the user device via a copyright control program.

* * * * *

UNITED STATES PATENT AND TRADEMARK OFFICE
CERTIFICATE OF CORRECTION

```
PATENT NO.        : 7,447,914 B1
APPLICATION NO.   : 08/895493
DATED             : November 4, 2008
INVENTOR(S)       : Makota Saito
```

It is certified that error appears in the above-identified patent and that said Letters Patent is hereby corrected as shown below:

<u>Column 9</u>

Line 61 Claim 4, please delete "digital data that are permitted by received one ore more utilization permit keys" and substitute --digital data that are permitted by received one or more utilization permit keys--.

Signed and Sealed this

Third Day of November, 2009

David J. Kappos
*Director of the United States Patent and Trademark Office*